2 Sheets—Sheet 1.
T. H. KING.
Vehicle Wheel.
No. 202,271. Patented April 9, 1878.
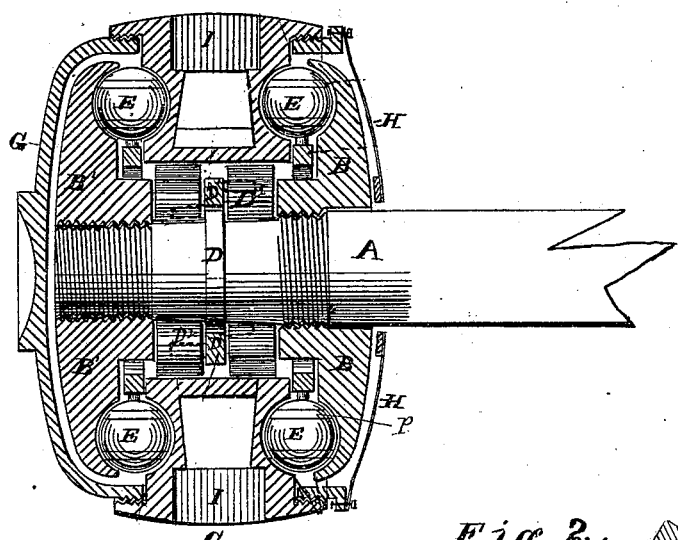
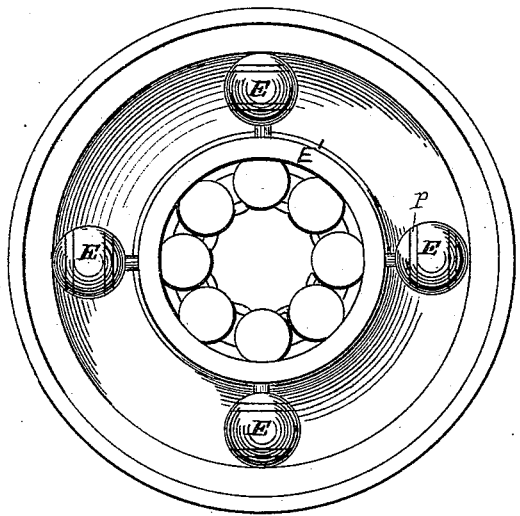
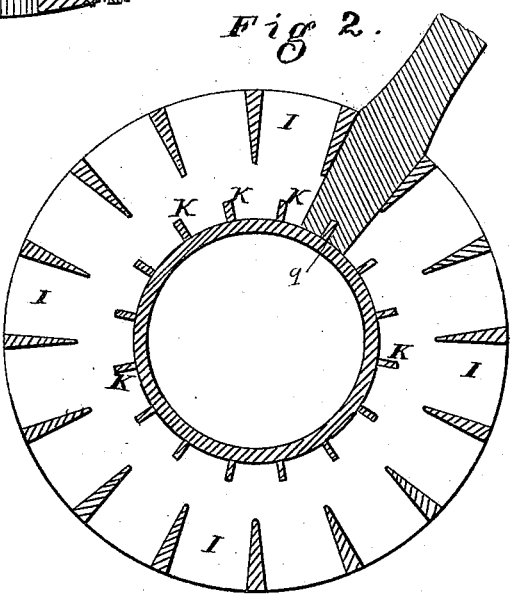
Witnesses
Geo. H. Strong
Frank A. Brooks
Inventor
Thomas Henry King 2 Sheets—Sheet 2.
T. H. KING.
Vehicle Wheel.
No. 202,271. Patented April 9, 1878.
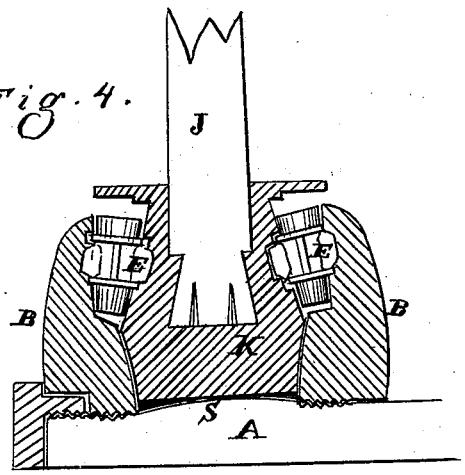
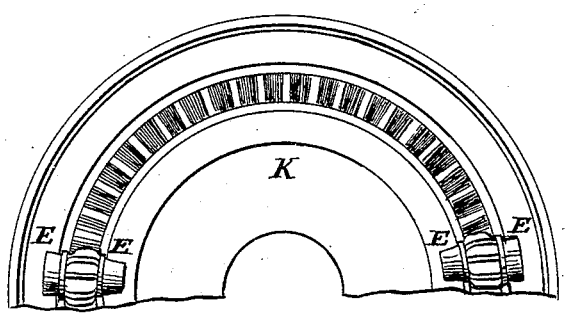
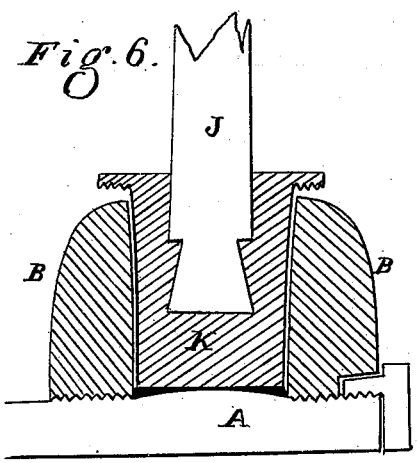
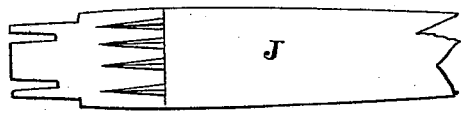
Witnesses
Geo. H. Strong
Frank A. Brooks
Inventor
Thomas Henry King

UNITED STATES PATENT OFFICE.

THOMAS H. KING, OF SAN FRANCISCO, CALIFORNIA.

IMPROVEMENT IN VEHICLE-WHEELS.

Specification forming part of Letters Patent No. 202,271, dated April 9, 1878; application filed February 2, 1878.

*To all whom it may concern:*

Be it known that I, THOMAS H. KING, of the city and county of San Francisco, and State of California, have invented an Improvement in Wheels for Wheeled Vehicles; and I do hereby declare the following to be a full, clear, and exact description thereof, reference being had to the accompanying drawings.

My invention relates to certain improvements in wheels for wheeled vehicles; and it consists, first, in a novel construction of the hub with certain bearing-flanges and anti-frictional devices, whereby I am enabled to reduce or entirely eliminate the tendency to break the axle which results from the side strains upon the wheel; and, secondly, in a novel method of securing the spokes, so that a wooden spoke may be secured in a perfectly solid manner within a metallic hub. It also consists in a novel method of completely closing and protecting the interior of the wheel against dust.

Referring to the accompanying drawings for a more complete explanation of my invention, Figure 1 is a longitudinal section. Fig. 2 is a vertical transverse section. Fig. 3 shows the step-bearing rollers or balls to relieve the end friction. Figs. 4, 5, and 6 show modifications to be used with lubrication. Fig. 7 shows a single spoke.

In the ordinary construction of vehicle-wheels there is great strain brought upon the axle consequent upon the excessive side strains upon the wheel as it moves over uneven surfaces, and it thus acts as a powerful lever to bend and break the axle, and it is this action, instead of the direct weight, that does finally break so many axles.

In my invention I propose to relieve the axle-spindle from strain caused by lateral bearing or wabbling of the wheel by construction of the flanges between which the hub revolves and is held in its lateral motion, so that nearly all but vertical bearing is taken off the axle-spindle, as I will now proceed to describe.

A is the axle, and it is provided with a flange, B, which is approximately of the diameter of the wheel-hub. This flange is practically a part of the axle, being formed with or rigidly secured to it. The hub C is of a length approximately twice the width of a spoke, and another flange, B', corresponding with the first, is secured to the outer end or point of the axle, so that when in position the hub is upon the axle between the two flanges, and these flanges will sustain the lateral strain and motion of the wheel.

The spindle $s$ of the axle is constructed with its upper surface curved, as seen in Figs. 4 and 6, and its lower surface straight, so that the bearing on the lower side is a flat bearing and on the upper side a curved bearing, the friction-rollers touching at the top only next to the collar D. This construction allows the wheel to tip slightly when there is a lateral thrust without crimping the axle between the friction-rollers, because the curved upper surface of the spindle gives the outer edges of the rollers play enough to avoid such binding or crimping.

In order to relieve the friction of the hub against the flanges they may be constructed with conical cog-rollers, fitting and rolling between the faces of the hub and the corresponding faces of the flanges, this construction being used with an ordinary lubricated axle. The same construction of hub and flanges may also be used in combination with an anti-friction-roller bearing, both vertical and lateral, which I will now describe. The vertical bearing is constructed in the same manner as my annular alternate bearing, which is fully described in another application for a patent made by me. The lateral bearing consists of spherical balls or rollers, held apart and in the proper position by means of a spider, annulus, or step-bearing, E', so as to rotate between the faces of the hub and the flanges. When balls are employed, a groove or track may be made in the corresponding faces of the hub, and flanges for them to run in. In order to prevent noise and rattling I have grooved the rollers or balls at $p$, and an elastic washer or strip is introduced, as shown, which, while it does not prevent a complete metallic bearing when pressure comes upon the parts, will expand, so as to prevent looseness and rattling when the pressure is removed.

By this construction the strain, instead of being brought to bear upon an axle near the shoulder, is transferred to a side pressure upon the plate or flange B, and the friction between the end of the hub and this flange is relieved by the anti-friction balls or rollers.

The outer end of the hub is hermetically closed by means of a cap, G, which is screwed upon it. In order to close the inner end against the entrance of dust and dirt, I employ a convex steel or other suitable disk, H, secured to the hub C, and which has a central hole to receive the axle.

A leather or other elastic washer is interposed between the disk and the flange B, and when the wheel is in place this disk presses with a light elastic lateral contact against the flange, so as to form a secure dust-cap and protect the interior parts, it being understood I do not limit the application of the disk to this particular kind of hub or axle, for it is obvious that it may be applied to ordinary hubs and axle having a collar, when, being adjusted to the hub and reaching behind the axle-collar, it will in like manner seal that side of hub.

The bearing upon the axle consists of the annular alternate bearing of a series of rollers, $D^2$, turning on central pins projecting from a loose annulus, $D^1$.

With these rollers it is necessary to employ a thrust-bearing flange, D, fixed rigidly upon the axle or spindle, as shown, the use and effect of the flange being precisely the same as it would be if made to project from the interior of an inclosing box or case.

In order to use the metallic hub it is necessary to secure the spokes in some permanent manner, and so that they cannot work loose. This I accomplish by serrating or corrugating the sides of the mortises I in the hub, as shown, so that when the spoke J is driven into the mortised it fills all the spaces between the serrations or corrugations, and is thus held firmly and prevented from lateral working. In order to still better hold and sustain the wooden spokes in place, I have formed a lip or projection, K, at the bottom of the mortise, and a corresponding slit or notch, $q$, is made in the end of the spoke to fit this lip. Wedges being also introduced into the spoke as it is driven into the hub, it will be thus caused to completely fill the tapering shape of the mortise and produce the most solid fit possible.

Having thus described my invention, what I claim, and desire to secure by Letters Patent, is—

1. The axle A, provided with lateral bearing-faced flanges B B', and the spindle S, with a curved upper surface, in combination with a hub provided with lateral bearing-faces to receive the lateral thrust, substantially as set forth.

2. The metallic wheel-hub C, having the lateral bearing-faces grooved or toothed, as shown, and the rigid flanges B upon the axle, having corresponding bearing-faces, in combination with the anti-frictional balls or rollers E, with their supporting-frame or spider, substantially as and for the purpose herein described.

3. The convex elastic disk H, secured to the hub C and extending behind the flange B or the axle-collar, so as to exert a constant lateral pressure and serve as a dust-cap, substantially as shown and herein described.

4. A hub provided with mortises I, in combination with the transverse ribs K and slotted spokes $q$, substantially as set forth.

5. In a vehicle-wheel having anti-frictional bearings, balls or rollers E, having grooves for the reception of an elastic substance to prevent noise and rattling, substantially as shown and herein described.

6. The axle A, provided with the guiding-flange D, in combination with the annulus $D^1$ and rollers $D^2$, substantially as described.

In witness whereof I have hereunto set my hand and seal.

THOMAS HENRY KING. [L. S.]

Witnesses:
   GEO. H. STRONG,
   FRANK A. BROOKS.